United States Patent
Lu et al.

(10) Patent No.: US 10,318,417 B2
(45) Date of Patent: Jun. 11, 2019

(54) PERSISTENT CACHING OF MEMORY-SIDE CACHE CONTENT

(71) Applicant: Intel Corporation, Santa Clara, CA (US)

(72) Inventors: Patrick Lu, Mesa, AZ (US); Karthik Kumar, Chandler, AZ (US); Francesc Guim Bernat, Barcelona (ES); Thomas Willhalm, Sandhausen (DE)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/476,866

(22) Filed: Mar. 31, 2017

(65) Prior Publication Data

US 2018/0285260 A1    Oct. 4, 2018

(51) Int. Cl.
*G06F 12/08* (2016.01)
*G06F 12/06* (2006.01)
*G06F 12/0873* (2016.01)
*G06F 12/0868* (2016.01)
*G06F 12/0891* (2016.01)
*G06F 12/02* (2006.01)
*G06F 13/16* (2006.01)
*G06F 13/42* (2006.01)

(52) U.S. Cl.
CPC ...... *G06F 12/0638* (2013.01); *G06F 12/0246* (2013.01); *G06F 12/0868* (2013.01); *G06F 12/0873* (2013.01); *G06F 12/0891* (2013.01); *G06F 13/1694* (2013.01); *G06F 13/4239* (2013.01); *G06F 2212/7201* (2013.01)

(58) Field of Classification Search
CPC ............ G06F 12/0246; G06F 12/0868; G06F 12/0873; G06F 12/0891
USPC ........................................... 711/117
See application file for complete search history.

(56) References Cited

U.S. PATENT DOCUMENTS

| | | | |
|---|---|---|---|
| 2006/0136656 A1* | 6/2006 | Conley | G06F 12/0246 711/103 |
| 2010/0180065 A1* | 7/2010 | Cherian | G06F 12/0804 711/103 |
| 2015/0186281 A1* | 7/2015 | Cherian | G06F 12/0804 711/103 |
| 2017/0147429 A1* | 5/2017 | Motwani | G06F 3/0619 |
| 2017/0147490 A1* | 5/2017 | Arafa | G06F 12/0804 |

* cited by examiner

*Primary Examiner* — Than Nguyen
(74) *Attorney, Agent, or Firm* — Thorpe North and Western, LLP; Todd B. Alder

(57) ABSTRACT

Persistent caching of memory-side cache content for devices, systems, and methods are disclosed and discussed. In a system including both a volatile memory (VM) and a nonvolatile memory (NVM), both mapped to the system address space, software applications directly access the NVM, and a portion of the VM is used as a memory-side cache (MSC) for the NVM. When power is lost, at least a portion of the MSC cache contents is copied to a storage region in the NVM, which is restored to the MSC upon system reboot.

26 Claims, 9 Drawing Sheets

PERSISTENT CACHING OF MEMORY-SIDE CACHE CONTENT

BACKGROUND

Computer systems operate by executing instruction sequences that form a computer program. These instructions sequences are stored in a memory subsystem, along with any data operated on by the instructions, both of which are retrieved as necessary by a processor, such as a central processing unit. The speed of CPUs have increased at a much faster rate compared to the memory subsystems upon which they rely for data and instruction code, and as such, memory subsystems can be a significant performance bottleneck. While one solution to this bottleneck would be to primarily use in a computer system only very fast memory, such as static random-access memory, the cost of such memory would be prohibitive. In order to balance cost with system performance, memory subsystem architecture is typically organized in a hierarchical structure, with faster expensive memory operating near the processor at the top, slower less expensive memory operating as storage memory at the bottom, and memory having an intermediate speed and cost, operating in the middle of the memory hierarchy.

Further techniques can be implemented in order to further improve the efficiency of a memory hierarchy. For example, cache buffering of data between memory levels can reduce the frequency that lower speed memory is accessed. In another example, parallel access channels can be used, both within and in between memory levels, to perform data operations in parallel.

DESCRIPTION OF EMBODIMENTS

Figure 1A:
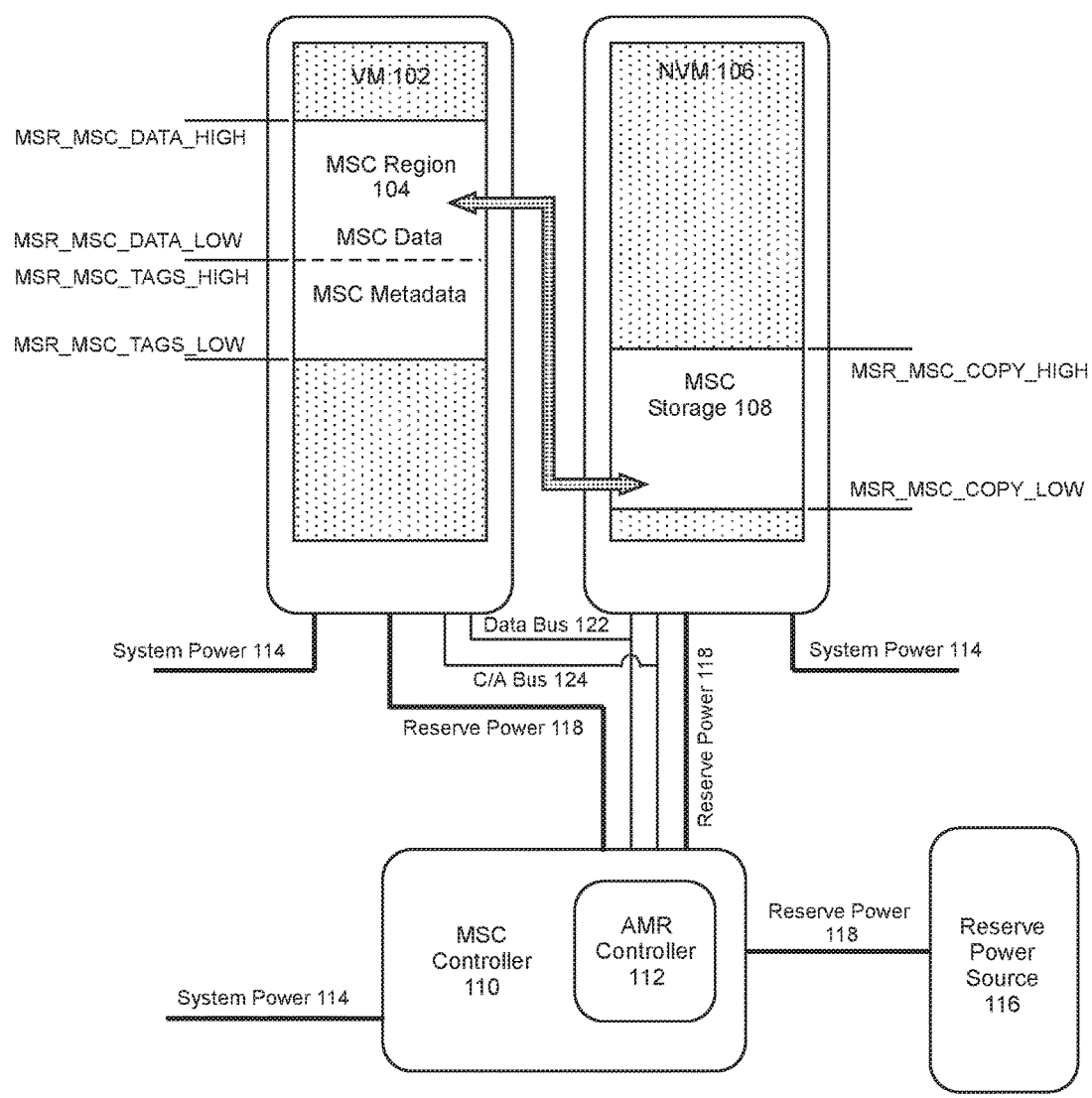
FIG. 1A illustrates a persistent cache subsystem in accordance with an example embodiment.

Although the following detailed description contains many specifics for the purpose of illustration, a person of ordinary skill in the art will appreciate that many variations and alterations to the following details can be made and are considered included herein. Accordingly, the following embodiments are set forth without any loss of generality to, and without imposing limitations upon, any claims set forth. It is also to be understood that the terminology used herein is for describing particular embodiments only, and is not intended to be limiting. Unless defined otherwise, all technical and scientific terms used herein have the same meaning as commonly understood by one of ordinary skill in the art to which this disclosure belongs. Also, the same reference numerals in appearing in different drawings represent the same element. Numbers provided in flow charts and processes are provided for clarity in illustrating steps and operations and do not necessarily indicate a particular order or sequence.

Furthermore, the described features, structures, or characteristics can be combined in any suitable manner in one or more embodiments. In the following description, numerous specific details are provided, such as examples of layouts, distances, network examples, etc., to provide a thorough understanding of various embodiments. One skilled in the relevant art will recognize, however, that such detailed embodiments do not limit the overall concepts articulated herein, but are merely representative thereof. One skilled in the relevant art will also recognize that the technology can be practiced without one or more of the specific details, or with other methods, components, layouts, etc. In other instances, well-known structures, materials, or operations may not be shown or described in detail to avoid obscuring aspects of the disclosure.

In this application, "comprises," "comprising," "containing" and "having" and the like can have the meaning ascribed to them in U.S. patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. patent law. "Consisting essentially of" or "consists essentially of" have the meaning generally ascribed to them by U.S. patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the compositions nature or characteristics would be permissible if present under the "consisting essentially of" language, even though not expressly recited in a list of items following such terminology. When using an open-ended term in this written description, like "comprising" or "including," it is understood that direct support should be afforded also to "consisting essentially of" language as well as "consisting of" language as if stated explicitly and vice versa.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, the term "about" is used to provide flexibility to a numerical range endpoint by providing that a given value may be "a little above" or "a little below" the endpoint. However, it is to be understood that even when the term "about" is used in the present specification in connection with a specific numerical value, that support for the exact numerical value recited apart from the "about" terminology is also provided.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 1.5, 2, 2.3, 3, 3.8, 4, 4.6, 5, and 5.1 individually.

This same principle applies to ranges reciting only one numerical value as a minimum or a maximum. Furthermore, such an interpretation should apply regardless of the breadth of the range or the characteristics being described.

Reference throughout this specification to "an example" means that a particular feature, structure, or characteristic described in connection with the example is included in at least one embodiment. Thus, appearances of phrases including "an example" or "an embodiment" in various places throughout this specification are not necessarily all referring to the same example or embodiment.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments described herein are, for example, capable of operation in other orientations than those illustrated or otherwise described herein.

As used herein, comparative terms such as "increased," "decreased," "better," "worse," "higher," "lower," "enhanced," and the like refer to a property of a device, component, or activity that is measurably different from other devices, components, or activities in a surrounding or adjacent area, in a single device or in multiple comparable devices, in a group or class, in multiple groups or classes, or as compared to the known state of the art. For example, a data region that has an "increased" risk of corruption can refer to a region of a memory device which is more likely to have write errors to it than other regions in the same memory device. A number of factors can cause such increased risk, including location, fabrication process, number of program pulses applied to the region, etc.

An initial overview of embodiments is provided below and specific embodiments are then described in further detail. This initial summary is intended to aid readers in understanding the disclosure more quickly, but is not intended to identify key or essential technological features, nor is it intended to limit the scope of the claimed subject matter.

New and evolving memory technologies allow the use of nonvolatile memory (NVM) in roles that extend beyond traditional memory storage. One example of such a role is that of main or system memory. Nonvolatile system memory has many advantages, such as high density, large capacity, reduced manufacturing complexity, to name a few. One further distinction for a nonvolatile system memory such as, for example, three-dimensional (3D) cross point memory, comes from the use of such memory as persistent system memory, as opposed to NVM functioning as volatile system memory. While persistent system memory using NVM can be highly advantageous, in some cases memory access latency for NVM can be relatively high, which can potentially limit system performance. In order to overcome the potential persistent system memory access latency overhead associated with NVM, the present disclosure provides technology that hides at least a portion of this increased memory access latency behind a volatile memory (VM) cache.

In one example, the system memory in a device, system, network, or the like, is made up of at least a VM and a NVM, both of which are exposed or otherwise mapped to the system address space. A portion of the VM is used as a cache for the NVM, which is referred to as a memory-side cache (MSC), and is mapped to a MSC region of the system address space. This so called "persistent mode (PM) caching" can effectively reduce the memory access latency overhead associated with a persistent system memory. Note, however, that this configuration differs from most 2-Level Memory (2LM) modes, where the NVM is exposed through the system address space to the operating system (OS) as VM, and is thus not functioning as persistent memory. In contrast, the VM and NVM of the present disclosure can be configured according to numerous architectures, provided that both are mapped to the system address space, and the NVM is functioning as persistent system memory. For example, they can be located together on a hybrid dual in-line memory module (DIMM), located on separate DIMMs, located together on a common package, such as, for example, in-package memory (iPM), located separately, with one memory type on a processor or other host package and the other memory type on a DIMM, and the like, including any workable combination thereof.

While such PM caching of data in a lower latency memory tier can be an effective technique to reduce long latencies associated with system NVM, in some cases such a caching operation can be sub-optimal for applications that, for example, may take time to reach an optimal caching steady state following a boot operation. For example, in some database applications having a critical or core data set, it can take time for a sufficient number of queries to access the working data set until the critical dataset has been cached. Until this occurs, system performance can be unpredictable and below expectations for the system. In some examples, it can take up to 20 minutes or more for a database to reach steady state. Such a situation can be unacceptable for use cases such as transaction processing, for example. One possible solution is for an application to preload the working or critical data set before the application starts. However, in many cases the application would be unaware of the proper working dataset to bring into cache, as the dataset can depend on a set of users and use cases. In multi-tenant cases, for example, no individual application has a full view of the working dataset.

The present disclosure provides technology that solves this problem by preloading the MSC during system reboot, such as through basic input/output system (BIOS), which not only reduces the "downtime" of an application with regard to caching steady state, but is also OS and application agnostic. In one example, an asynchronous memory refresh (AMR) subsystem is provided to store and restore the cache contents of the MSC (or MSCs) between volatile and nonvolatile system memories. Thus, upon notice of an impending power interruption, the AMR initiates a copy procedure to store at least a portion of the MSC in a storage location that is unaffected by the power interruption. Upon reboot, the MSC contents in the storage location are copied back to the MSC in VM, either by the AMR or other component of the system. In some examples, the MSC storage location can be a reserved region of the NVM, and thus the VM provides a MSC for the NVM, and the NVM provides a storage region for the MSC during a power interruption. A power interruption can be any type of interruption of power capable of causing a loss of MSC data in the VM. In some examples, a power interruption can be an anticipated power interruption, such as a system shut down, an OS reboot, a system hibernation, or the like. In other examples, a power interruption can be an unanticipated (by the system) power interruption, or power failure, such as a power supply failure, a power outage external to the system, a deliberate switching off of power to a running system, a deliberate hard reset applied to the system, or the like. As such, the AMR stores the MSC contents in the NVM for both anticipated and unanticipated power interruptions.

Figure 2:
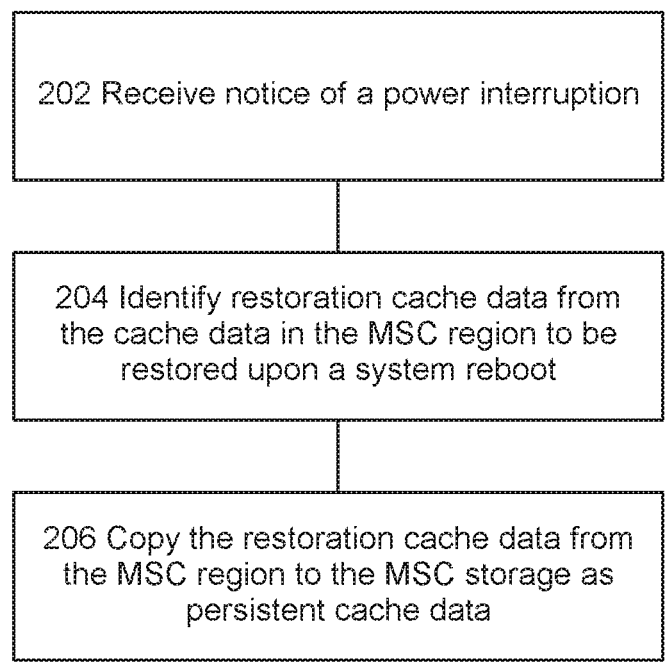
FIG. 2 is a diagram showing functionality of an asynchronous memory refresh controller in accordance with an example embodiment.

As one nonlimiting example, FIG. 1A shows a persistent cache subsystem including a NVM 106 directly accessible by software applications and configured to map to a system address space when in use. The NVM 106 further comprises a MSC storage 108 that is mapped to the system address space, which is reserved for storing persistent cache data during a power interruption. The subsystem further comprises a VM 102 communicatively coupled to the NVM 106, and configured to map to the system address space when in use. The VM 102 further comprises a MSC region 104 that is mapped to the system address space, which is reserved as a MSC for the NVM 106. A MSC controller 110 is communicatively coupled to the NVM 106 and the VM 102 via a data bus 122 and a command/address bus 124, and is configured to manage caching between the MSC region 104 and the NVM 106 for one or more software applications. The MSC controller 110 can be a controller dedicated to caching and cache data manipulation in the MSC region, or the MSC controller 110 can be a component, circuit, logic, or function of a controller, such as a memory controller. The subsystem further includes an AMR logic or AMR controller 112. The AMR controller 112 can be integrated with the MSC controller 110, as shown, or the AMR controller 112 can be separate from the MSC controller 110. In some examples, the AMR controller 112, or portions of the AMR controller 112, can be realized at multiple different locations, according to AMR functionality, which may be described herein collectively as "the AMR controller." Referring to FIG. 2, the AMR controller 112 can be configured to, or otherwise include AMR circuitry configured to, 202 receive notice of a power interruption, 204 identify restoration cache data from the cache data in the MSC region 104 to be restored upon a system reboot, and 206 copy, either directly or through a controller such as the MSC controller 112, the restoration cache data from the MSC region 104 to the MSC storage 108 as persistent cache data. It is noted that the address spaces for the MSC region 104 and the MSC storage 108 can be located at any available location or locations within the VM 102 and the NVM 106, and that each can be configured in various sizes according to the needs of the associated system, the anticipated size of the cache, and the like.

Returning to FIG. 1A, system power 114 is provided by a system power source (not shown) to the VM 102, the NVM 106, the MSC controller 110, and the AMR controller 112, over various system power rails of system power 114. The subsystem can additionally include a reserve power source 116 electrically coupled through the AMR controller 112 over various reserve power rails of reserve power 118 to subsystem components needed to copy the cache data from the MSC region 104 to the MSC storage 108. These components can vary depending on the memory subsystem architecture. In one example, the cache data can be copied with at least the VM 102, the NVM 106, and the AMR controller 112, having reserve power. In another example, the cache data can be copied with at least the VM 102, the NVM 106, the MSC controller 110 or other memory controller, and the AMR controller 112, having reserve power. For anticipated power interruptions, the restoration cache data can be copied to the MSC storage 108 using the system power provided by the system power 114, as in such cases, the system can continue to supply power until the copy of the restoration cache data is completed before shutting down. In the case of an unanticipated power interruption, or power failure, on the other hand, a drop in power supplied via system power 114 is often the event that generates the notice of the power failure, and, by the time the AMR controller 112 receives the notice, the system power rails of system power 114 may have insufficient power to perform the copy operation. In such cases, the AMR controller 112 can route power from the reserve power supply source 116 over the reserve power rails of reserve power 118. The reserve power source 116 can be a battery, a capacitor, or the like, which can be a dedicated reserve power source, a component of the system power hardware, or both. For example, the reserve power source 116 can be one or more dedicated capacitors that are charged by the system power during system operation, and used only in the case of a power failure to perform the copy operation when insufficient system power is available to do so. In another example, a reserve power source 116 can be one or more capacitors that are charged by the system power during system operation, and are utilized as part of the system power subsystem during normal use. In the event of a power failure, the capacitors can provide sufficient stored power to the AMR controller 112 to perform the copy operation. In yet another example, the reserve power source 116 can be one or more dedicated capacitors and one or more system power capacitors that are combined in the event of a power failure to provide reserve power to the AMR controller 112. While reserve power rails of the reserve power 118 can be distinct from system power rails of the system power 114, in some examples reserve power provided by the reserve power source 116 can be sent to some or all of the components involved in the copy operation of the persistent cache subsystem over system power rails of the system power 114. Given the potential to power components of the system that are not part of the persistent cache subsystem, however, it can be beneficial in such cases to disable unneeded system power rails to avoid wasting reserve power.

Various techniques can be utilized to identify the cache data in the MSC region to be copied (i.e., the restoration cache data) to the MSC storage (i.e., as persistent cache data), which can depend on a variety of factors, such as, for example, the nature of the power interruption, the size of the MSC, the amount of available power, the priority of different portions of the cache data, and the like. In some cases, for example, all of the cache data in the MSC region is copied to the MSC storage in response to a power interruption. In other cases, only a portion of the cache data in the MSC region is copied to the MSC storage in response to a power interruption. The portion of cache data to copy and restore upon reboot can also be determined according to a variety of techniques, nonlimiting examples of which can include a range of cache line addresses within the MSC region, a percentage of the MSC region, a selection of specific cache data, and the like, including combinations thereof. In one example of such a combination, a range of an MSC region can be identified to be copied in the event of a power interruption, and the MSC can select or otherwise identify specific cache data to be copied, which can be stored and maintained within that range of the MSC region. In another nonlimiting example, a selection of specific cache data can be identified, and a range of the MSC region can be selected that includes the specific cache data for copying upon a power interruption. In one example, a location-based technique can be utilized that involves identifying a system address location and checking to see if the cache line is present. In another example, a tag-based technique can be utilized that involves checking tags for the cache line at a number of possible candidate locations.

One technique that can be implemented in a range-based implementation utilizes a register or registers to identify a range or ranges in the MSC region for copying. In one example, such registers can include various model specific registers (MSRs), which are generally used to provide access to system features that are tied to implementation-dependent aspects of a particular processor architecture. For example, testability features that provide test access to physical structures, such as caches, are inherently model specific. MSRs are configurable, and can specify a range, percentage, or other MSC addressing metric to identify a specific area or areas of the MSC region to be copied to the MSC storage and restored upon system reboot. Returning to FIG. 1A, six example MSRs can be utilized to establish ranges for a copy operation. These MSRs can be configured via BIOS or program code, and can be provided to the persistent cache subsystem components at boot time, or upon system reboot. The MSRs in FIG. 1A show coverage of the entire MSC region 104; however, this is merely one example, and the MSRs are not necessarily tied to the full address space of the region, but can define only a portion of the MSC region 104 in some cases. As nonlimiting example MSRs, MSR_MSC_DATA_HIGH and MSR_MSC_DATA_LOW can be used to specify the range of the MSC region address space corresponding to the cache data to be copied. As has been stated, this range can include the entire address space, or only a portion thereof. If metadata is to be used, another useful set of MSRs can include MSR_MSC_TAGS_HIGH and MSR_MSC_TAGS_LOW, which can be utilized to specify the range of the MSC region address space corresponding to the metadata of the cached data in the MSC region address space identified, for example, by MSR_MSC_DATA_HIGH and MSR_MSC_DATA_LOW. In another example, the MSRs MSR_MSC_COPY_HIGH and MSR_MSC_COPY_LOW can be utilized to specify the MSC storage 108 address space of the NVM 106 that can be used to store the MSC copy. In some cases, the cache data and the associated metadata can be stored contiguously, and the first bytes can be used to store metadata of the MSC copy (e.g., the size of the cache data copy and size of metadata) that can be used to restore the MSC at system reboot.

In one example of a copy operation, the AMR controller 112 receives notice of a power interruption, and retrieves the MSC region address range(s) containing the cache data to be copied from MSR_MSC_DATA_HIGH and MSR_MSC_DATA_LOW, and, if metadata is to be copied as well, the MSC address range containing the associated metadata from MSR_MSC_TAGS_HIGH and MSR_MSC_TAGS_LOW. The AMR controller 112 also retrieves the location into which the cache data will be copied in the MSC storage 108 from MSR_MSC_COPY_HIGH and MSR_MSC_COPY_LOW. These ranges can then be sent to the MSC controller 110 (or other controller), which generates memory commands to perform the copy operation. Additionally, other MSRs can be utilized, depending on the nature of the cache data selection, the copy operation, and the like. It is noted that, as the MSC storage 108 in the NVM 106 is reserved for the copy of the cache data from the MSC region 104, this reserved region is not used by software, and as such the memory address range specified in MSR_MSC_COPY_HIGH/LOW is not exposed to the software stack, and is not used for other purposes by hardware.

Figure 1B:
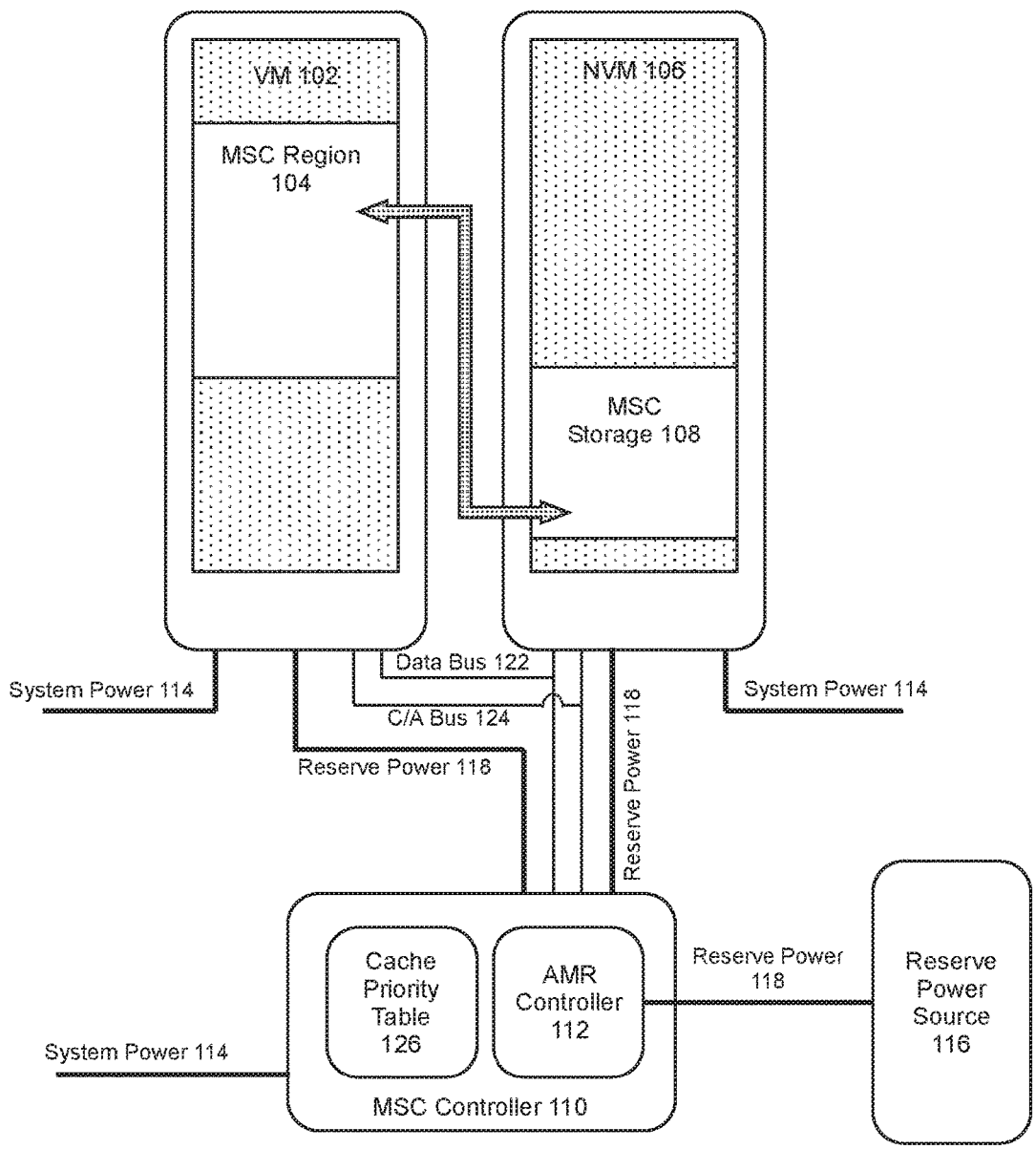
FIG. 1B illustrates a persistent cache subsystem in accordance with an example embodiment.

FIG. 1B shows an example of a persistent cache subsystem similar to that shown in FIG. 1A, but where the cache data to be copied is determined based on some form of priority of cache lines in the MSC region 104. The subsystem can include a cache priority table 126 communicatively coupled to the MSC controller 110 and to the AMR controller 112, which can be located in the MSC controller 110 in some cases, or in the AMR controller 112 in other cases. In one example, the AMR controller 112 can determine the restoration cache data to copy to the MSC storage 108 from the cache priority table 126, and, either initiate the copy by sending the restoration cache data information along with memory commands to memory, or send the restoration cache data information to the MSC controller 110 with the MSC copy instructions. Depending on the memory system configuration, the AMR controller 112 can identify specific cache lines, groups of cache lines, or the like, from the cache priority table 126, or a percentage or range of cache lines from the cache priority table 126, which may or may not represent the full memory address space of the MSC region 104. In other words, the cache priority table 126 may include cache line entries for the entire MSC region 104 address space, or only a portion thereof.

As such, the MSC controller can be configured to, or include circuitry configured to, store, in the cache line priority table, a pointer to each cache line that is in the MSC region, and determine a restoration priority for cache lines, or each cache line, in the cache line priority table. The MSC controller can, in some cases, maintain the pointers in the cache line priority table according to any of a number of patterns. For example, the pointers in the cache line priority table can be ordered according to priority in some cases, according to prioritized groups of pointers in other cases, according to no intentional order in yet other cases, or the like, including combinations thereof. In one example, the cache line pointers can be ordered according to priority groupings, such as at least two groupings of pointers where each group has a restoration priority. In another example, the cache line pointers can be ordered as a list, such as a sequential list, according to the priority order, or in other words, a list of cache lines ordered according to the priority in which the cache lines are to be copied. For example, hot cache line data is data that is, will need to be, or is estimated to be, accessed frequently, or is more likely to be accessed compared to other data, while cold cache line data is data that is, or will be, or is estimated to be, accessed infrequently or with less frequency. By ordering the cache lines in the cache priority table 126 according to access frequency or access likelihood (i.e., data "hotness"), the AMR controller 112 can identify cache lines that will include the cache data that will be most likely to be used by software when restored to the MSC region 104 upon system reboot. In essence, the cache priority table 126 can include a list of pointers to hot cache lines that will likely need to be copied, which can speed up the selection and copying of cache data because it is not necessary to process all of the cache line TAG+ Metadata to select the cache lines that are hot. By utilizing the cache priority table 126, the list of pointers is merely updated when a cache line becomes hot, and when a cache line is no longer hot. In another example, the list can be maintained in groups according to priority, and the groups can be prioritized in the cache priority table, which can reduce list maintenance.

In another example, the MSC controller 110 can utilize an algorithm to maintain the priority of pointers in the cache priority table 126, or a portion of the pointers, according to various nonlimiting organizational schemes. Any algorithm can be utilized that can identify or predict the "hotness," importance, or any other cache line parameter that can identify cache lines that, when restored to the MSC region upon system reboot, decrease run-time latency overheads. In some examples, such algorithms can be used to order the list of pointers in the cache priority table. In other examples, such algorithms can be used to select cache lines from the list of pointers to be included in the copy operation. The selection can be made across the entire copy priority table 126, or a portion thereof, such as a percentage of the total list. As the amount of cache data that can be copied may depend on available power, particularly in the case of an unanticipated power failure, algorithms that allow fast selection of cache lines can be beneficial. In one example, a least recently used (LRU) algorithm can be utilized to identify the cache lines to be copied. In another example, the algorithm is the cache replacement algorithm that is used by the MSC controller in managing the MSC, and thus, at least in some cases, the order of the pointers in the copy priority table can mirror, or at least approximate, the order of the associated cache lines in the MSC region. Furthermore, in addition to hot cache lines, in some cases the restoration cache data can include cache lines selected, not due to the likelihood or frequency of access, but due to other factors of program operation that reduce memory access latency overheads.

In some cases, however, a subsystem or device may not have sufficient power to select cache lines cache lines using an algorithm for a selective copy. In such cases, it may be beneficial to copy a range or ranges of the MSC 104 address space, including in some cases the metadata (e.g., the address or TAG, LRU bits, etc.), as described above, for example. It is noted that numerous cache replacement algorithms exist, any of which can be used to select cache lines to be copied. However, in cases where power is limited, benefits between different algorithms may be miniscule when compared to the amount of cache data that can be copied given the dwindling power. Additionally, depending on the system architecture and the amount of power available, in some examples it can be more beneficial to prioritize the copying of additional cache data over the selection of cache data to be copied. In other words, the importance of selecting hot cache data can be balanced against the available power. For example, in situations where the power interruption is anticipated, or for power failures in a system having an excess of reserve power, having sufficient power to copy the entire MSC region to the MSC storage can preclude the need to select restoration cache data based on hotness or some other metric. While not required, in such cases the entire MSC region can be copied to the MSC storage. In situations where power is more limiting, the importance of the selection of hot cache lines for the restoration cache data becomes more important. With respect to an application dataset, for example, when power permits, the entire working data set can be copied to the MSC storage, thus ensuring that an associated critical dataset has been copied as well. Under power-limiting situations, however, identifying or otherwise estimating the critical dataset for copying becomes more important. In such examples, the critical dataset, a portion of the critical data set, or a discrete portion of the working dataset that includes the critical dataset, is copied to the MSC storage.

The VM can include any type of VM, and is not considered to be limiting. VM is a storage medium that requires power to maintain the state of data stored by the medium. Nonlimiting examples of volatile memory can include random access memory (RAM), such as static random access memory (SRAM), dynamic random-access memory (DRAM), synchronous dynamic random access memory (SDRAM), and the like, including combinations thereof. SDRAM memory can include any variant thereof, such as single data rate SDRAM (SDR DRAM), double data rate (DDR) SDRAM, including DDR, DDR2, DDR3, DDR4, DDR5, and so on, described collectively as DDRx, and low power DDR (LPDDR) SDRAM, including LPDDR, LPDDR2, LPDDR3, LPDDR4, and so on, described collectively as LPDDRx. In some examples, DRAM complies with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209B for LPDDR SDRAM, JESD209-2F for LPDDR2 SDRAM, JESD209-3C for LPDDR3 SDRAM, and JESD209-4A for LPDDR4 SDRAM (these standards are available at www.jedec.org; DDR5 SDRAM is forthcoming). Such standards (and similar standards) may be referred to as DDR-based or LPDDR-based standards, and communication interfaces that implement such standards may be referred to as DDR-based or LPDDR-based interfaces. In one specific example, the system memory can be DRAM. In another specific example, the system memory can be DDRx SDRAM. In yet another specific aspect, the system memory can be LPDDRx SDRAM.

NVM is a type of persistent storage medium, or in other words, a storage medium that does not require power to maintain the state of data stored therein. Nonlimiting examples of NVM can include planar or three-dimensional (3D) NAND flash memory, NOR flash memory, cross point array memory, including 3D cross point memory, phase change memory (PCM), such as chalcogenide PCM, nonvolatile dual in-line memory module (NVDIMM), ferroelectric memory (FeRAM), silicon-oxide-nitride-oxide-silicon (SONOS) memory, polymer memory (e.g., ferroelectric polymer memory), ferroelectric transistor random access memory (Fe-TRAM), spin transfer torque (STT) memory, nanowire memory, electrically erasable programmable read-only memory (EEPROM), magnetoresistive random-access memory (MRAM), write in place non-volatile MRAM (NVMRAM), nanotube RAM (NRAM), and the like, including combinations thereof. The above-mentioned types of NVM may be byte or block addressable. In some examples, non-volatile memory can comply with one or more standards promulgated by the Joint Electron Device Engineering Council (JEDEC), such as JESD218, JESD219, JESD220-1, JESD223B, JESD223-1, or other suitable standard (the JEDEC standards cited herein are available at www.jedec.org). In one specific example, the system memory can be 3D cross point memory.

AMR can include any technology that allows the detection of a power interruption, and is capable of initiating a copy of the cache data from the MSC address space to the MSC storage. In one example, AMR can mitigate inconsistent states between what is written in memory and what is held in cache, or in other words, dirty cache lines, a term used to describe cache lines that contain data that has been changed, and that needs to be written back to memory. In a power interruption, writing such dirty cache lines back to memory is not required, as the MSC region is written to the MSC storage, and upon reboot, the cache data, including the dirty cache lines, are written back to the MSC region, and are still identified as containing dirty data. If, however, only a portion of the MSC region is to be copied to the MSC storage, it can be beneficial to identify any dirty cache lines that are not included in the copy operation, and either include them in the copy operation, or write them back to memory prior to power loss.

In one example of an anticipated power interruption, a central processing unit (CPU), or other processor or processor core, receives an early warning of the interruption or reset from platform logic, which can vary depending on the system platform. As a result, the CPU sends a notice to the AMR controller of the anticipated power interruption, and the AMR initiates the copy procedure. The CPU can monitor a signal from an associated power management system to receive advanced warning of power interruption. In one example, the CPU can monitor the state of a power management synchronization (PM_SYNC) interconnect, which provides communication from a power management system to the CPU. For an unanticipated power failure, such as a global reset, power supply interruption, or the like, however, the CPU will not receive such advance warning through the PM_SYNC interface, because PM_SYNC control is immediately lost in such situations. Accordingly, the present persistent cache subsystem facilitates notice to the CPU of such unanticipated power failures. In one example configuration, an early warning that AC power has been lost, and that the voltage on the platform rails will soon be dropping, can be received by the CPU from, for example, a power supply. In one example, a general-purpose input/output (GPIO) pin can be connected to the PM_SYNC interface, which can be powered for a sufficient time to provide notice to the CPU before the PM_SYNC interface power fails. With such advance notice, the CPU can send the notice to the AMR controller of the impending power failure.

Upon reboot of a system following a power interruption, the persistent cache data stored in the MSC storage of the NVM is restored to the MSC region of the VM. In one example, the persistent cache data can be stored contiguously, along with any associated metadata, in the MSC storage. A portion of the MSC storage, such as the first bytes of the MSC storage, for example, can include the metadata of the persistent cache data copy (e.g., the size of the copy, the size of the associated metadata, etc.), which can be used upon system reboot to restore the persistent cache data copy to the MSC region. Upon system reboot, BIOS determines that there is a persistent cache data copy in the MSC storage, and executes instructions to load the persistent cache data from the copy into the MSC region. In some examples, the instructions to load the persistent cache data can be sent to the CPU, which in turn notifies the system memory controller (or the MSC controller) to generate the commands to copy the persistent cache data from the MSC storage to the MSC region of the VM. By restoring at least a portion of the prior MSC region cache data following a system reboot, applications can be at, or can more quickly reach, an optimal cache steady state to improve application performance.

The configuration of persistent cache subsystems can vary depending on the system architecture, the operational use of a given system, and the like. For example, the VM, the NVM, or both, can be supported on one or more DIMMS, on separate VM and NVM DIMMS, separate hybrid DIMMS, or the like, including combinations thereof. In the case of a hybrid DIMM, for example, a portion of the DIMM can be used as a MSC for the associated NVM, as well as for a NVM on another DIMM, or another hybrid DIMM. In some cases, multiple DIMMs, including hybrid DIMMS, can utilize the MSC from a single, or limited number of, VM locations. In another example, the VM, the NVM, or both, can be integrated on or in a processor package as iPM. In yet another example, iPM and DIMM-based memory can be utilized in a persistent cache system, with either memory type included as iPM. Any combination of VM and NVM according to any memory architecture is considered to be within the present scope, provided both the VM and the NVM are exposed to the system address map, and the NVM is being used as part of persistent system memory.

Figure 3A:
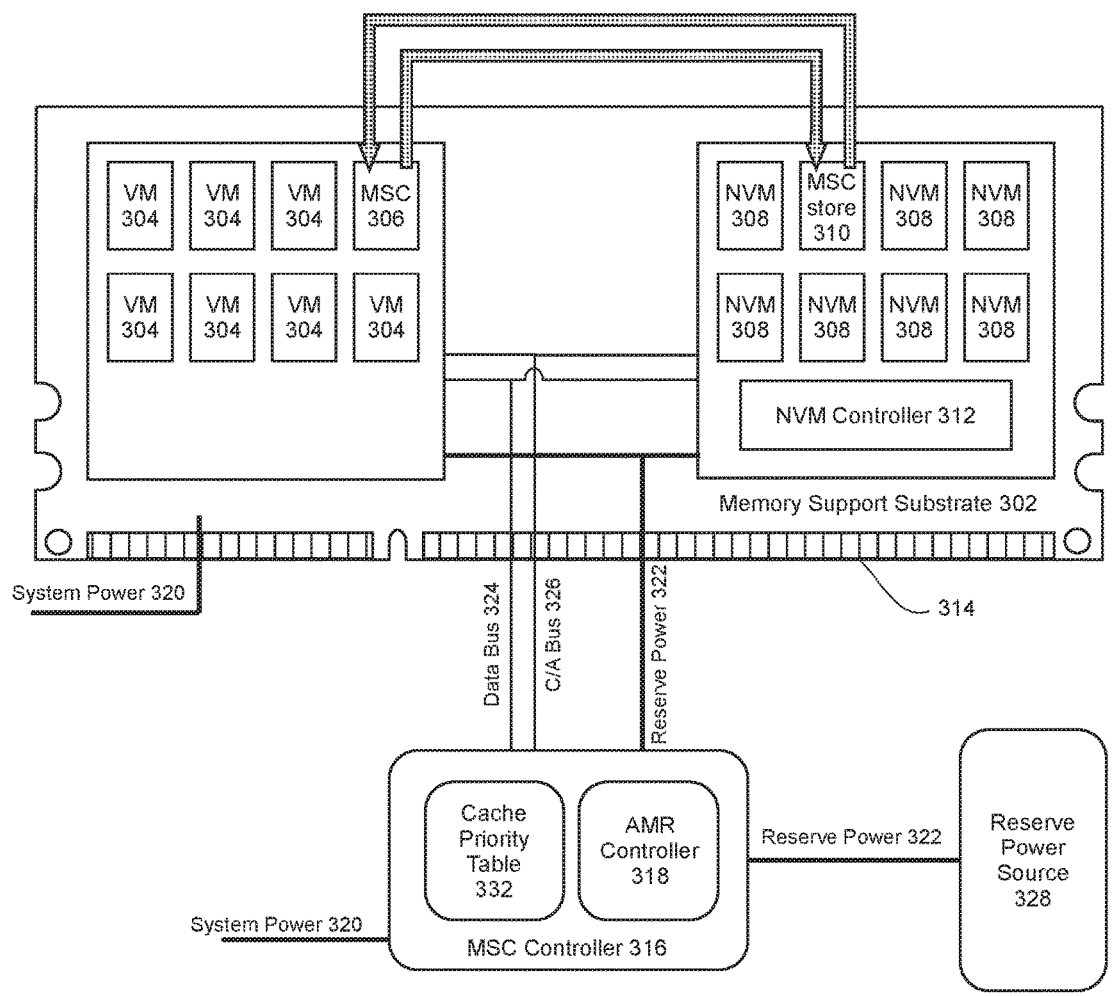
FIG. 3A illustrates a hybrid memory device and a persistent cache subsystem in accordance with an example embodiment.

FIG. 3A shows one nonlimiting example of a hybrid memory device, comprising a memory support substrate 302, a NVM 308 (comprised, in this case, of multiple NVM elements) coupled to the memory support substrate, directly accessible by software applications, and configured to map to a system address space when in use. The NVM 308 further comprises a MSC storage (MSC store 310) that is mapped to the system address space, and which is reserved for storing persistent cache data during a loss of power. Additionally, the NVM 308 is configured as persistent memory. The subsystem further comprises a VM 304 (comprised, in this case, of multiple VM elements) communicatively coupled to the NVM 308, and configured to map to the system address space when in use. The VM 304 further comprises a MSC region (MSC 306) that is mapped to the system address space, and which is reserved as a MSC for the NVM 308. In some examples, the memory support substrate 302 can be configured as a DIMM. The hybrid memory device can also include a NVM controller 312 communicatively coupled to the NVM 308, and in some cases, the VM 304, which can be configured to perform memory-related operations on the device.

FIG. 3A shows the VM 304 and the NVM 308 as pluralities of memory elements, which can represent any structural memory element, such as, for example, dies, planes, chips, packages, and the like, including combinations thereof. Additionally, while the MSC region 306 and the MSC storage 310 are each shown as coinciding with a memory element, it is understood that the MSC region 306 and the MSC storage 310 are not bound by memory element structure, and thus can each reside in a portion or portions of a memory element, as well as across multiple memory elements. Furthermore, the MSC region 306 and the MSC storage 310 can each occupy continuous or discontinuous regions of the associated physical memory, as well as continuous or discontinuous regions of the system address space.

The memory support substrate 302 can include a memory interface 314, through which the VM 304 and the NVM 308 are configured to communicatively couple to a MSC controller 316 that is configured to manage caching of cache data in the MSC region 306 for one or more software applications, and an AMR controller 318 communicatively coupled to the MSC controller 316. The MSC controller 316, and in some cases the AMR controller 318, communicate with the NVM 308 and the VM 304 over a data bus 324 and a command/address bus 326 routed through the memory interface 314. The MSC controller 316 can be a distinct controller as shown, or in some cases can be a memory controller, such as an integrated memory controller. In one example, the MSC controller 316 is a memory controller and the copy operation in a power interruption is performed by the NVM controller 312. The AMR controller, as previously described, includes AMR circuitry configured to receive a notice of a power interruption, identify restoration cache data from the cache data in the MSC region 306 to be restored upon a reboot, and copy the restoration cache data from the MSC region 306 to the reserved MSC storage 310 as persistent cache data.

As described above, system power is provided by a system power source to the VM 304 and the NVM 308 when coupled to the system via the memory interface 314, and to the MSC controller 316 and the AMR controller 318 over various system power rails of system power 320. The device can additionally receive reserve power via a reserve power rail of reserve power 322. In one example, the reserve power 322 can be delivered from a reserve power source 328 to the memory support substrate 302 through the AMR controller 318 to hybrid memory device components necessary to copy the cache data from the MSC region 306 to the MSC storage 310. These components can vary depending on the memory subsystem architecture. For anticipated power interruptions, the cache data can be copied using the system power 320, as the system can continue to supply power until the copy of the cache data is completed before shutting down. In the case of an unanticipated power failure, the AMR controller 318 can provide power from the reserve power supply source 328 via the reserve power rail of reserve power 320.

The selection of the restoration cache data can be performed according to any technique, such as, for example, by the range-based, the percentage-based, or the cache line priority techniques described above, including combinations thereof. Depending on the techniques used, a MSC controller may or may not include a cache priority table for tracking the restoration priority of cache lines in the MSC cache. FIG. 3A, however, shows an example including the cache priority table 332 associated with the MSC controller 316 and the AMR controller 318.

Figure 3B:
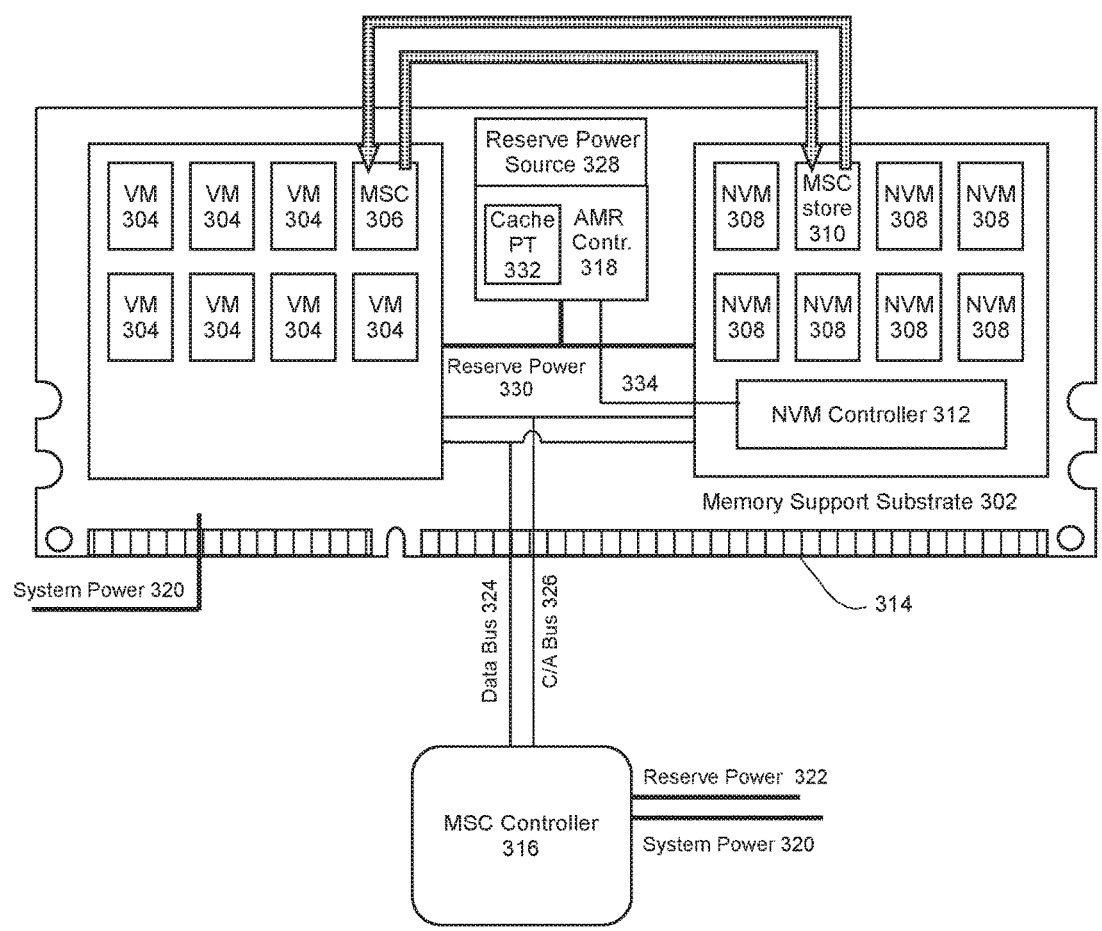
FIG. 3B illustrates a hybrid memory device and a persistent cache subsystem in accordance with an example embodiment.

FIG. 3B shows another example of a hybrid memory device with some similarities to the device shown in FIG. 3A. In this example, however, the AMR controller 318 is located on the memory support substrate 302. The AMR controller 318 can be electrically coupled to a reserve power source 328, either on the memory support substrate 302 with the AMR controller 318, or located away from the memory support substrate and electrically coupled to the AMR controller 318 through the memory interface 314. Regardless, reserve power from the reserve power source 328 is switchably provided to the components of the hybrid memory device through local reserve power rails of reserve power 322. The MSC controller 316 and the AMR controller 318 can communicate with one another through the data bus 324 and/or the command/address bus 326, or via a dedicated communication interface (not shown). In some examples, the NVM controller 312 can be, or otherwise function as, the MSC controller 316, including cache management and persistent cache line copy operations. In other examples, the NVM controller 312 can perform the persistent cache line copy operations, and a separate MSC controller 316 can perform the cache management operations for the MSC 306. In yet another example, the MSC controller 316 is a memory controller, such as an integrated memory controller, in communication with the NVM controller 312. As such, in configurations where the NVM controller 316 is involved in copying the restoration cache data from the MSC 306 address space to the MSC storage (MSC store 310), the AMR controller 318 can be communicatively coupled to the NVM controller 312, as shown at 334. Also, FIG. 3B shows a cache priority table 332 associated with the AMR controller 318, which may or may not be present in a given device, depending on the techniques used to select the restoration cache data. In this case, the MSC controller 316 (or the NVM controller 312) updates the cache priority table 332, which is read locally by the AMR controller 318 to select the restoration cache data. Alternatively, the cache priority table 332 can be located at the MSC controller 316, where it is maintained locally and read remotely by the AMR controller 318. In yet another example, a cache priority table can be maintained at both locations.

As has been described above, the VM can include any type of volatile memory, as well as, in some examples, NVM configured to function as VM. In other words, the NVM can be configured such that memory stored therein is not persistent, and thus is rendered unavailable when a system reboots following a power loss. This can be accomplished by various techniques, such as erasing the contents of the NVM prior to shutdown, encrypting the contents of the NVM during use and discarding the encryption key when power is lost, scrambling the addresses of address tables of the memory controller associated with the NVM, and the like.

Figure 4A:
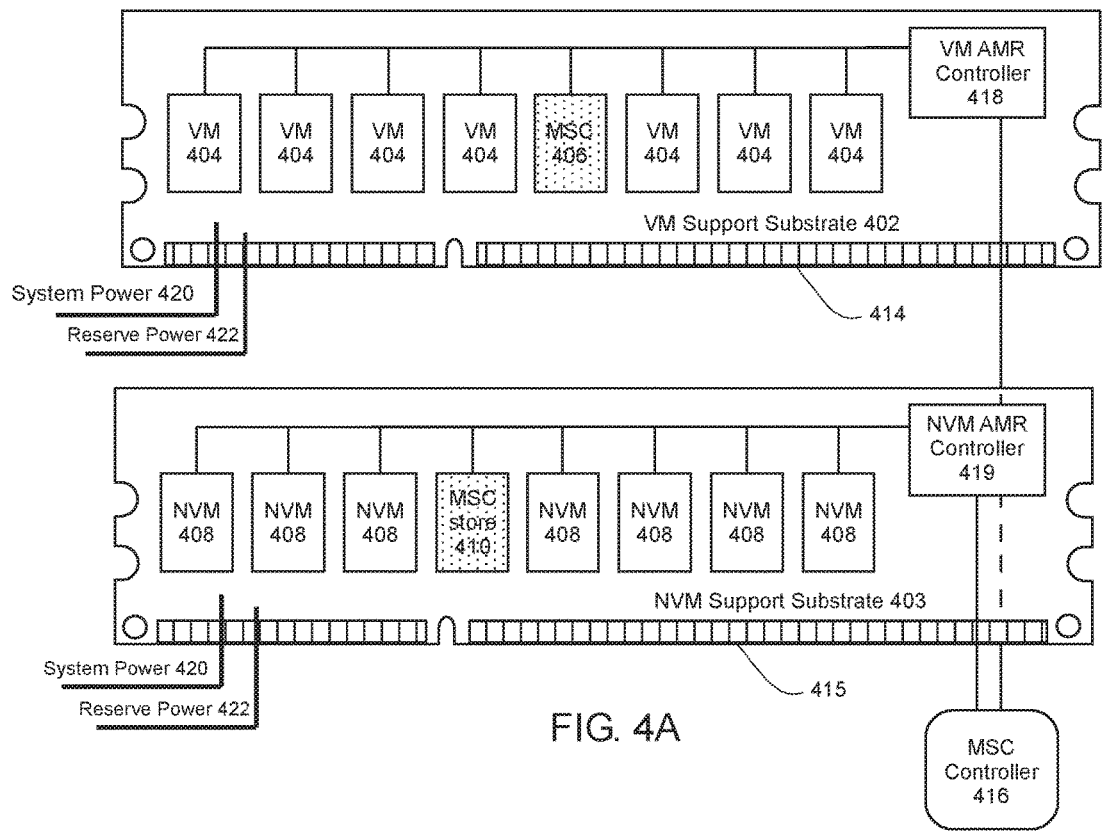
FIG. 4A illustrates a nonvolatile memory device, a volatile memory device, and a persistent cache subsystem in accordance with an example embodiment.

FIG. 4A shows a nonlimiting example of a configuration that includes separate memory devices for the NVM and the VM. The VM device comprises a VM support substrate 402, a VM 404 (comprised, in this case, of multiple VM elements), coupled to the VM support substrate 402, where the VM 404 is configured to map to a system address space when in use, including a MSC region (MSC 406) that is mapped to the system address space, and which is reserved as a MSC for the NVM 408. In some examples, the VM support substrate 402 can be configured as a DIMM. The VM device also includes a VM AMR controller 418 communicatively coupled to the VM 404, the MSC 406, and a VM interface 414. The VM device additionally includes a system power input 420 through the VM interface 414, and a source of reserve power, either via a reserve power input 422 or a reserve power source (not shown) on the VM support substrate 402. The NVM device comprises a NVM support substrate 403, a NVM 408 (comprised, in this case, of multiple NVM elements) coupled to the NVM support substrate 403, where the NVM 408 is configured to map to a system address space when in use, is configured as persistent memory, and is directly accessible by software applications. The NVM 408 includes a MSC storage (MSC store 410) region that is mapped to the system address space, and which is reserved for storing persistent cache data during a loss of power. In some examples, the NVM support substrate 403 can be configured as a DIMM. The NVM device also includes a NVM AMR controller 419, which can comprise a NVM controller with AMR controller logic, communicatively coupled to the NVM 408, the MSC storage 410, and a NVM interface 415. The NVM device additionally includes a system power input 420 through the NVM interface 415, and a source of reserve power, either via a reserve power input 422 or a reserve power source (not shown) on the NVM support substrate 403.

Figure 4B:
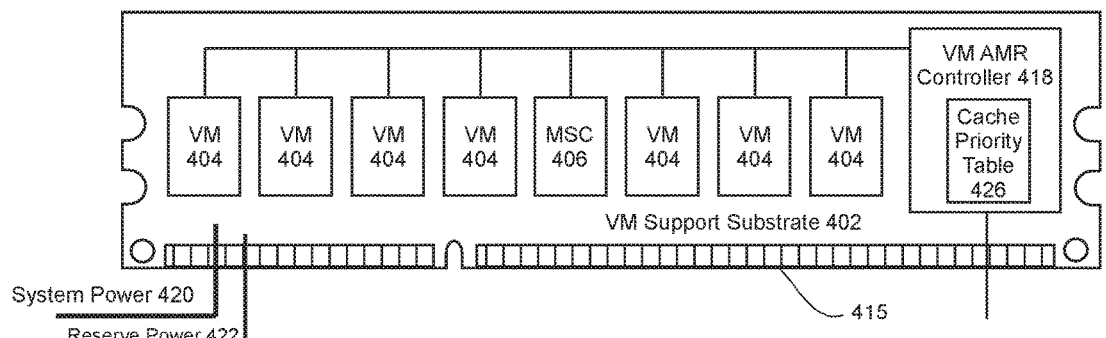
FIG. 4B illustrates a volatile memory device in accordance with an example embodiment.

The VM device and the NVM device are configured to communicatively couple to a MSC controller 416 (which can be a memory controller, in some cases) through the VM interface 414 and the NVM interface 415, respectively. The MSC controller 416 can be dedicated to managing the MSC cache 406 in some cases, or the MSC controller 416 can manage the MSC cache 406 and perform traditional memory controller functions for the VM device, the NVM device, or both. In some cases, the NVM device can include a NVM controller to manage memory operations in addition to the NVM AMR controller 419. Given the physical separation between the VM 404 and the NVM 408 across VM interface 414 and the NVM interface 415, the AMR functionality for the example of FIG. 4A is divided into the VM AMR controller 418 and the NVM AMR controller 419, which are each supported on the appropriate device. In some configurations, a portion of the AMR controller function or logic can be located apart from both devices, which can perform operations common to both. Additionally, this portion of the AMR controller can receive the notice of a power interruption, and send appropriate instructions to each of the VM AMR controller 418 and the NVM AMR controller 419 to perform the copy operation. It is noted, however, that these configurations are not limiting, and in some cases the AMR controller can be located entirely on either DIMM, or entirely apart from both DIMMs. FIG. 4B shows an example of a VM device similar to the VM device shown in FIG. 4A. In this example, however, the VM AMR controller 418 includes a cache priority table 425 that maintains pointers to cache lines in the MSC region 406, as described above.

One issue that can arise when restoring the MSC region cache involves data security. When moving the persistent cache data from the MSC storage to the MSC region of the VM, an attacker may be able to snap shot the cache data before the NVM has been fully initialized. Encrypting the restoration cache data prior to sending it to the MSC storage can effectively address this potential security risk. For example, the MSC controller or other memory controller can include an encryption/decryption engine that is configured to encrypt the restoration cache data prior to being copied from the MSC region. The encryption can be by any known algorithm or technique, which is not considered to be limiting. The restoration cache data is thus encrypted prior to leaving the controller, and is thus stored in the MSC storage as encrypted persistent cache data. Upon system reboot, the encrypted persistent cache data is returned to the controller for decryption. An attacker taking a snap shot of the cache data at any point from the time the cache data leaves the controller to the time the cache data returns to the controller, will only obtain a snap shot of encrypted data. Any encryption key used to encrypt the cache data can be maintained on the controller, and thus is not obtainable by the attacker.

Figure 5:
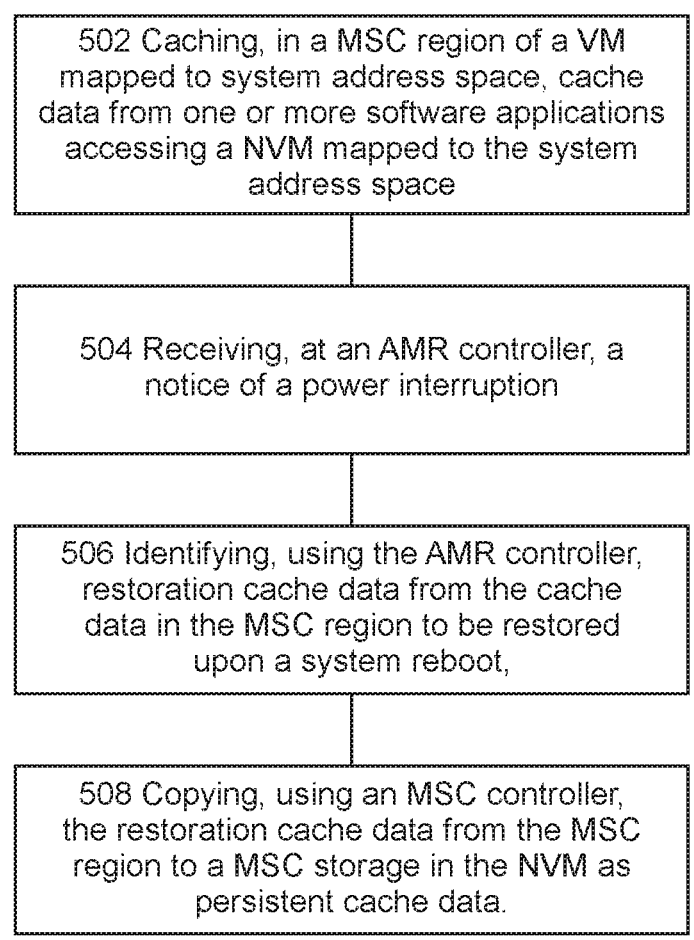
FIG. 5 shows steps of a method of reducing memory access latency overhead in software-accessible persistent system memory in accordance with an example embodiment.
Figure 6:
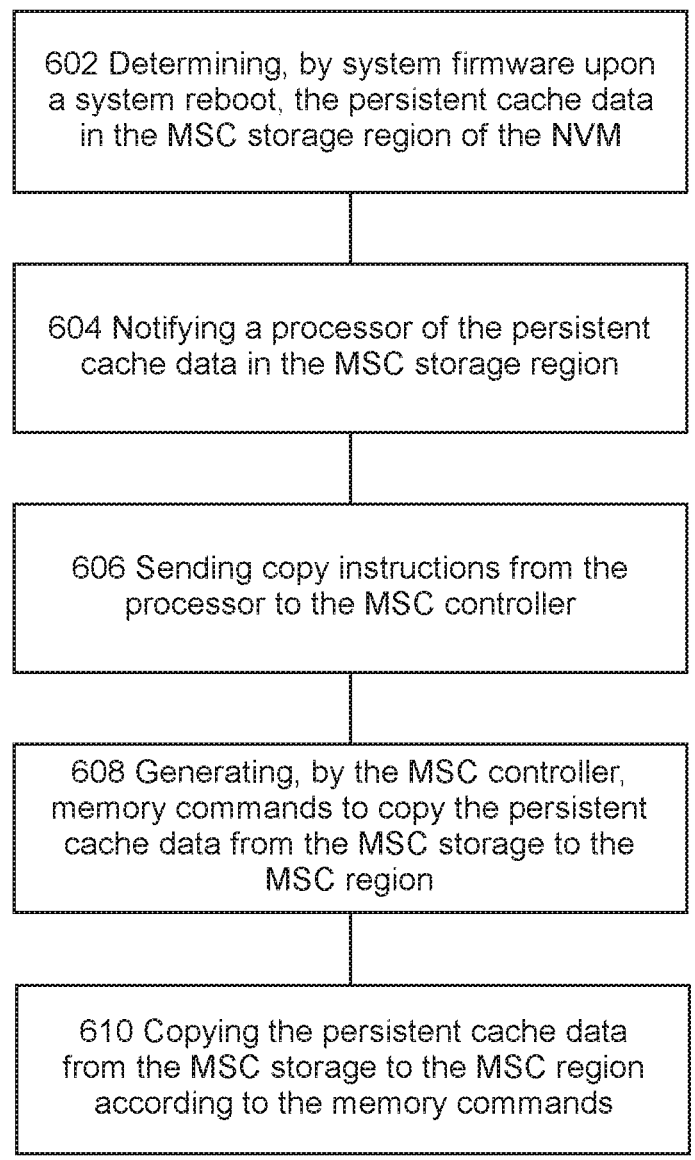
FIG. 6 shows steps of a method of reducing memory access latency overhead in software-accessible persistent system memory in accordance with an example embodiment.

The present disclosure additionally provides various methods. In one example, as is shown in FIG. 5, a method of reducing memory access latency overhead in software-accessible persistent system memory is provided. The method can include, 502 caching, in a MSC region of a VM mapped to a system address space, cache data from one or more software applications accessing a NVM mapped to the system address space, 504 receiving, at an AMR controller, a notice of a power interruption, 506 identifying, using the AMR controller, restoration cache data from the cache data in the MSC region to be restored upon a system reboot, and 508 copying, using an MSC controller, the restoration cache data from the MSC region to a MSC storage in the NVM as persistent cache data. In another example, as is shown in FIG. 6, a method can include 602 determining, by system firmware upon a system reboot, the persistent cache data in the MSC storage region of the NVM, 604 notifying a processor of the persistent cache data in the MSC storage region, 606 sending copy instructions from the processor to the MSC controller. 608 generating, by the MSC controller, memory commands to copy the persistent cache data from the MSC storage to the MSC region, and 610 copying the persistent cache data from the MSC storage to the MSC region according to the memory commands.

In another example, prior to copying the restoration cache data from the MSC region to the MSC storage, the method can further include encrypting the restoration cache data in the MSC controller to generate encrypted restoration cache data, and copying the encrypted restoration cache data from the MSC region to the MSC storage as restoration cache data. In yet another example, in copying the persistent cache data from the MSC storage to the MSC region, the method can further include sending the encrypted persistent cache data from the MSC storage to the MSC controller, decrypting the encrypted persistent cache data by the MSC controller to generate persistent cache data, and copy the persistent cache data from the MSC controller to the MSC region.

Figure 7:
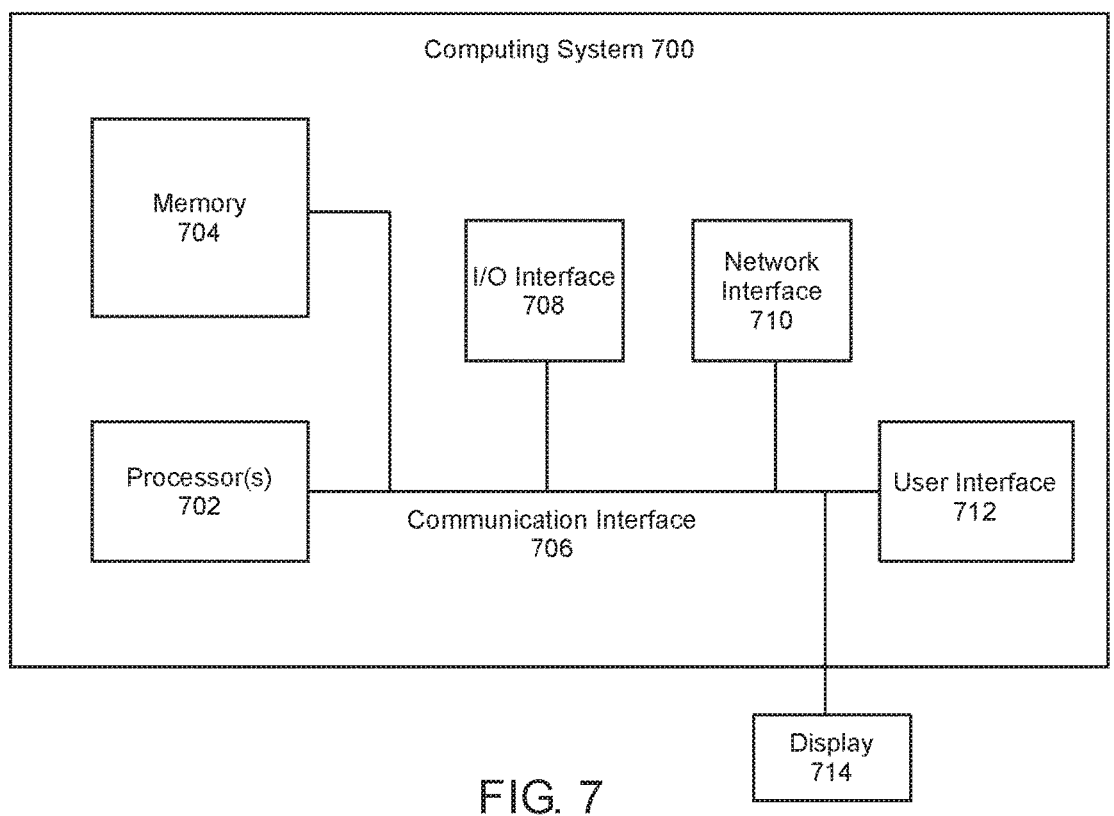
FIG. 7 is a block diagram of a computing system in accordance with an example embodiment.

As another example, FIG. 7 illustrates a general example of a computing system or device 700 that can incorporate the present technology. While any type or configuration of device or computing system is contemplated to be within the present scope, non-limiting examples can include node computing systems, system-on-chip (SoC) systems, system-in-package (SiP) systems, system-on-package (SoP) systems, server systems, networking systems, high capacity computing systems, laptop computers, tablet computers, desktop computers, smart phones, or the like.

The computing system 700 can include one or more processors 702 in communication with a memory 704. The memory 704 can include any device, combination of devices, circuitry, or the like, that is capable of storing, accessing, organizing, and/or retrieving data. Additionally, a communication interface 706, such as a local communication interface, for example, provides connectivity between the various components of the system. The communication interface 706 can vary widely depending on the processor, chipset, and memory architectures of the system. For example, the communication interface 706 can be a local data bus, command/address buss, package interface, or the like.

The computing system can also include an I/O (input/output) interface 708 for controlling the I/O functions of the system, as well as for I/O connectivity to devices outside of the computing system. A network interface 710 can also be included for network connectivity. The network interface 710 can control network communications both within the system and outside of the system, and can include a wired interface, a wireless interface, a Bluetooth interface, optical interface, communication fabric, and the like, including appropriate combinations thereof. Furthermore, the computing system can additionally include a user interface 712, a display device 714, as well as various other components that would be beneficial for such a system.

The processor 702 can be a single or multiple processors, including single or multiple processor cores, and the memory can be a single or multiple memories. The local communication interface 706 can be used as a pathway to facilitate communication between any of a single processor or processor cores, multiple processors or processor cores, a single memory, multiple memories, the various interfaces, and the like, in any useful combination. In some examples, the communication interface 706 can be a separate interface between the processor 702 and one or more other components of the system, such as, for example, the memory 704. The memory 704 can include system memory that is volatile, nonvolatile, or a combination thereof, as described herein. The memory 704 can additionally include NVM utilized as a memory store.

Various techniques, or certain aspects or portions thereof, can take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device can include a processor, a storage medium readable by the processor (including volatile and non-volatile memory and/or storage elements), at least one input device, and at least one output device. The volatile and non-volatile memory and/or storage elements can be a RAM, EPROM, flash drive, optical drive, magnetic hard drive, solid state drive, or other medium for storing electronic data.

EXAMPLES

The following examples pertain to specific embodiments and point out specific features, elements, or steps that can be used or otherwise combined in achieving such embodiments.

In one example, there is provided a persistent cache subsystem, comprising a nonvolatile memory (NVM) configured to map to a system address space when in use, the NVM is directly accessible by software applications, the NVM to include a memory-side cache (MSC) storage that is mapped to the system address space and is reserved for storing persistent cache data during a power interruption. The subsystem further includes a volatile memory (VM) configured to map to the system address space when in use, the VM to include a MSC region that is mapped to the system address space and that is reserved as a MSC for the NVM, a MSC controller communicatively coupled to the VM and the NVM, configured to manage caching between the MSC region and the NVM for one or more software applications, and an asynchronous memory refresh (AMR) controller communicatively coupled to the NVM and the VM. The AMR controller includes AMR circuitry configured to receive a notice of a power interruption, identify restoration cache data from the cache data in the MSC region to be restored upon a reboot, and copy the restoration cache data from the MSC region to the MSC storage as persistent cache data.

In one example of a persistent cache subsystem, the MSC controller is further configured to upon a system reboot, copy the persistent cache data from the MSC storage to the MSC region.

In one example of a persistent cache subsystem, the MSC region following reboot is mapped to the same system address space as the MSC region prior to the system reboot.

In one example of a persistent cache subsystem, the AMR controller is integrated with the MSC controller.

In one example of a persistent cache subsystem, the AMR circuitry, in identifying the restoration cache data, is further configured to identify the restoration cache data from associated metadata.

In one example of a persistent cache subsystem, the AMR circuitry, in identifying the restoration cache data, is further configured to identify the restoration cache data from an algorithm that estimates memory access likelihood.

In one example of a persistent cache subsystem, the algorithm is a cache replacement algorithm used by the MSC controller in managing the cache data in the MSC region.

In one example of a persistent cache subsystem, thus subsystem further comprises a cache line priority table communicatively coupled to the MSC controller and to the AMR controller, wherein the MSC controller comprises caching circuitry configured to store, in the cache line priority table, a pointer to each cache line in the MSC region, and determine a restoration priority for each cache line in the cache line priority table. The AMR circuitry, in identifying the restoration cache data, is further configured to identify a total size of cache data to be restored upon reboot and select a portion of the cache data from the cache line priority table according to the restoration priority of the cache lines up to the total size as the restoration cache data.

In one example of a persistent cache subsystem, the MSC circuitry is further configured to maintain at least two groupings of pointers according to restoration priority.

In one example of a persistent cache subsystem, the MSC circuitry is further configured to maintain an order of the pointers in the cache line priority table according to the restoration priority.

In one example of a persistent cache subsystem, the power interruption is an anticipated power interruption.

In one example of a persistent cache subsystem, the power interruption is an unanticipated power failure.

In one example of a persistent cache subsystem, the subsystem further comprises a reserve power source electrically coupled to the AMR controller and switchably coupled to the VM and the NVM, wherein the AMR circuitry is further configured to initiate power from the reserve power source to the VM and the NVM to copy the restoration cache data from the MSC region to the MSC storage at least when system power is insufficient to perform the copy.

In one example of a system, the reserve power source can include a capacitor, a battery, a system power reserve, or a combination thereof.

In one example of a persistent cache subsystem, in the reserve power source is switchably coupled to the MSC controller.

In one example of a persistent cache subsystem, the NVM is supported on a dual in-line memory module (DIMM).

In one example of a persistent cache subsystem, the VM is supported on the DIMM.

In one example of a persistent cache subsystem, the VM is supported on a separate DIMM from the NVM.

In one example of a persistent cache subsystem, the VM is supported on a processor package.

In one example of a persistent cache subsystem, the NVM is supported on a processor package.

In one example of a persistent cache subsystem, the VM is dynamic random-access memory (DRAM).

In one example of a persistent cache subsystem, the VM is NVM configured as VM.

In one example of a persistent cache subsystem, the NVM configured as VM is three-dimensional (3D) cross-point memory.

In one example of a persistent cache subsystem, the NVM is three-dimensional (3D) cross-point memory.

In one example of a persistent cache subsystem, the MSC controller further comprises an encryption/decryption engine communicatively coupled to the VM, and configured to encrypt the restoration cache data prior to being copied from the MSC region.

In one example, there is provided a hybrid memory device, comprising a memory support substrate, a nonvolatile memory (NVM) coupled to the memory support substrate configured to map to a system address space when in use, and is directly accessible by software applications, further comprising a memory-side cache (MSC) storage that is mapped to the system address space and that is reserved for storing persistent cache data during a power interruption. The hybrid memory device further comprises a volatile memory (VM) coupled to the memory support substrate and configured to map to the system address space when in use, and further comprising a MSC region that is mapped to the system address space and that is reserved as a MSC for the NVM, wherein the VM and the NVM are further configured to communicatively couple to a MSC controller configured to manage caching between the MSC region and the NVM for one or more software applications, and an asynchronous memory refresh (AMR) controller comprising AMR circuitry configured to receive a notice of a power interruption, identify restoration cache data from the cache data in the MSC region to be restored upon a reboot, and copy the restoration cache data from the MSC region to the MSC storage as persistent cache data.

In one example of a hybrid memory device, the memory support substrate is a dual in-line memory module (DIMM).

In one example of a hybrid memory device, the AMR controller is integrated with the MSC controller.

In one example of a hybrid memory device, the hybrid memory device further comprises the AMR controller coupled to the memory support substrate.

In one example of a hybrid memory device, the hybrid memory device further comprises a reserve power source coupled to the memory support substrate and electrically coupled to the AMR controller, and switchably coupled to the VM and the NVM, wherein the AMR circuitry is further configured to initiate power from the reserve power source to the VM and the NVM to copy the restoration cache data from the MSC region to the reserved MSC storage at least when system power is insufficient to perform the copy.

In one example of a hybrid memory device, the VM is dynamic random-access memory (DRAM).

In one example of a hybrid memory device, the VM is NVM configured as VM.

In one example of a hybrid memory device, the NVM configured as VM is three-dimensional (3D) cross-point memory.

In one example of a hybrid memory device, the NVM is three-dimensional (3D) cross-point memory.

In one example, there is provided a memory device, comprising a memory support substrate and a volatile memory (VM) interface coupled to the memory support substrate, and configured to communicatively couple to a non-volatile memory (NVM) configured to map to the system address space when in use, the NVM being directly accessible by software applications and further comprising a memory-side cache (MSC) storage that is mapped to the system address space, and that is reserved for storing persistent cache data during a power interruption. The memory device further comprises a volatile memory (VM) coupled to the memory support substrate and communicatively coupled to the VM interface, and configured to map to the system address space when in use, and further comprising a MSC region that is mapped to the system address space and that is reserved as a MSC for the NVM, wherein the VM is further configured to communicatively couple to a MSC controller configured to manage caching between the MSC region and the NVM for one or more software applications, and an asynchronous memory refresh (AMR) controller. The AMR further comprises AMR circuitry configured to receive a notice of a power interruption, identify restoration cache data from the cache data in the MSC region to be restored upon a reboot, and copy the restoration cache data from the MSC region to the MSC storage as persistent cache data.

In one example of a memory device, the memory support substrate is a dual in-line memory module (DIMM).

In one example of a memory device, the memory device further comprises the AMR controller coupled to the memory support substrate.

In one example of a memory device, the memory device further comprises a reserve power source coupled to the memory support substrate and electrically coupled to the AMR controller and switchably coupled to the VM, wherein the AMR circuitry is further configured to initiate power from the reserve power source to the VM to copy the restoration cache data from the MSC region to the reserved MSC storage at least when system power is insufficient to perform the copy.

In one example of a memory device, the VM is dynamic random-access memory (DRAM).

In one example of a memory device, the VM is NVM configured as VM.

In one example of a memory device, the NVM configured as VM is three-dimensional (3D) cross-point memory.

In one example, there is provided a memory device comprising a memory support substrate and a nonvolatile memory (NVM) coupled to the memory support substrate and configured to map to a system address space when in use, the NVM being directly accessible by software applications and further comprising a memory-side cache (MSC) storage that is mapped to the system address space, and that is reserved for storing persistent cache data during a power interruption. The memory device further comprises a NVM interface coupled to the memory support substrate and communicatively coupled to the NVM, and configured to communicatively couple to a volatile memory (VM) configured to map to the system address space when in use, and further comprising a MSC region that is mapped to the system address space and that is reserved as a MSC for the NVM, wherein the NVM is further configured to communicatively couple to a MSC controller configured to manage caching between the MSC region and the NVM for one or more software applications and an asynchronous memory refresh (AMR) controller. The AMR controller further comprises AMR circuitry configured to receive a notice of a power interruption, identify restoration cache data from the cache data in the MSC region to be restored upon a reboot, and copy the restoration cache data from the MSC region to the MSC storage as persistent cache data.

In one example of a memory device, the memory support substrate is a dual in-line memory module (DIMM).

In one example of a memory device, the memory device further comprises the AMR controller coupled to the memory support substrate.

In one example of a memory device, the memory device further comprises a reserve power source coupled to the memory support substrate and electrically coupled to the AMR controller and switchably coupled to the NVM, wherein the AMR circuitry is further configured to initiate power from the reserve power source to the NVM to copy the restoration cache data from the MSC address space to the reserved MSC storage at least when system power is insufficient to perform the copy.

In one example of a memory device, the NVM is three-dimensional (3D) cross-point memory.

In one example, there is provided a computing system comprising a processor, a power subsystem configured to provide power to the computing system, and a nonvolatile memory (NVM) configured to map to a system address space when in use, and is directly accessible by software applications, further comprising a memory-side cache (MSC) storage that is mapped to the system address space and that is reserved for storing persistent cache data during a power interruption. The computing system further comprises a volatile memory (VM) configured to map to the system address space when in use, and further comprising a MSC region that is mapped to the system address space and that is reserved as a MSC for the NVM, a MSC controller communicatively coupled to the VM and the NVM, and configured to manage caching between the MSC region and the NVM for one or more software applications, and an asynchronous memory refresh (AMR) controller communicatively coupled to the NVM and the VM. The AMR further comprises AMR circuitry configured to receive a notice of a power interruption, identify restoration cache data from the cache data in the MSC region to be restored upon a reboot, and copy the restoration cache data from the MSC region to the MSC storage as persistent cache data.

In one example of a computing system, the MSC controller is further configured to upon the system reboot, copy the persistent cache data from the MSC storage to the MSC region.

In one example of a computing system, the computing system further comprises a system firmware communicatively coupled to the processor, and configured to execute various instruction sets on the system reboot, wherein the system firmware is configured to copy the persistent cache data from the MSC storage to the MSC region on the system reboot following initialization of the system address space.

In one example of a computing system, the MSC region following the system reboot is mapped to the same system address as the MSC region prior to the system reboot.

In one example of a computing system, the AMR controller is integrated with the MSC controller.

In one example of a computing system, the AMR circuitry, in identifying the restoration cache data, is further configured to identify the restoration cache data from associated metadata.

In one example of a computing system, the AMR circuitry, in identifying the restoration cache data, is further configured to identify the restoration cache data from an algorithm that estimates access likelihood.

In one example of a computing system, the algorithm is a cache replacement algorithm used by the MSC controller in managing the cache data in the MSC region.

In one example of a computing system, wherein the computing system further comprises a cache line priority table communicatively coupled to the MSC controller and to the AMR controller, wherein the MSC controller comprises caching circuitry configured to store, in the cache line priority table, a pointer to each cache line in the MSC region, and determine a restoration priority for each cache line in the cache line priority table, wherein the AMR circuitry, in identifying the restoration cache data, is further configured to identify a total size of cache data to be restored upon the system reboot, and select a portion of the cache data from the cache line priority table according to the restoration priority of the cache lines up to the total size as the restoration cache data.

In one example of a computing system, the MSC circuitry is further configured to maintain at least two groupings of pointers according to restoration priority.

In one example of a computing system, MSC circuitry is further configured to maintain an order of the pointers in the cache line priority table according to the restoration priority.

In one example of a computing system, the power interruption is an anticipated power interruption.

In one example of a computing system, the power interruption is an unanticipated power failure.

In one example of a computing system, the computing system further comprises a reserve power source electrically coupled to the AMR controller and switchably coupled to the VM and the NVM, wherein the AMR circuitry is further configured to initiate power from the reserve power source to the VM and the NVM to copy the restoration cache data from the MSC region to the reserved MSC storage at least when system power is insufficient to perform the copy.

In one example of a system, the reserve power source can include a capacitor, a battery, a system power reserve, or a combination thereof.

In one example of a computing system, the reserve power source is switchably coupled to the MSC controller.

In one example of a computing system, the NVM is supported on a dual in-line memory module (DIMM).

In one example of a computing system, the VM is supported on the DIMM.

In one example of a computing system, the VM is supported on a separate DIMM from the NVM.

In one example of a computing system, the VM is supported on a processor package.

In one example of a computing system, the NVM is supported on a processor package.

In one example of a computing system, the VM is dynamic random-access memory (DRAM).

In one example of a computing system, the VM is NVM configured as VM.

In one example of a computing system, the NVM configured as VM is three-dimensional (3D) cross-point memory.

In one example of a computing system, the NVM is three-dimensional (3D) cross-point memory.

In one example of a computing system, the MSC controller further comprises an encryption/decryption engine communicatively coupled to the VM, and configured to encrypt the restoration cache data prior to being copied from the MSC region.

In one example, there is provided a method of reducing memory access latency overhead in software-accessible persistent system memory, comprising caching, in a memory-side cache (MSC) region of a volatile memory (VM) mapped to a system address space, cache data from one or more software applications accessing a nonvolatile memory (NVM) mapped to the system address space, receiving, by an asynchronous memory refresh (AMR) controller, a notice of a power interruption, identifying, using the AMR controller, restoration cache data from the cache data in the MSC region to be restored upon a system reboot, and copying, using an MSC controller, the restoration cache data from the MSC region to a MSC storage in the NVM as persistent cache data.

In one example of a method, the method further comprises determining, by system firmware upon system reboot, the persistent cache data in the MSC storage region of the NVM, notifying a processor of the persistent cache data in the MSC storage region, sending copy instructions from the processor to the MSC controller, generating, by the MSC controller, memory commands to copy the persistent cache data from the MSC storage to the MSC region, and copying the persistent cache data from the MSC storage to the MSC region according to the memory commands.

In one example of a method, prior to copying the restoration cache data from the MSC region to the MSC storage, the method further comprises encrypting the restoration cache data in the MSC controller to generate encrypted restoration cache data, and copying the encrypted restoration cache data from the MSC region to the MSC storage as restoration cache data.

In one example of a method, in copying the persistent cache data from the MSC storage to the MSC region, the method further comprises sending the encrypted persistent cache data from the MSC storage to the MSC controller decrypting the encrypted persistent cache data by the MSC controller to generate persistent cache data, and copy the persistent cache data from the MSC controller to the MSC region.

The invention claimed is:

1. A system, comprising:
a nonvolatile memory (NVM) configured to map to a system address space when in use, and is directly accessible by software applications, the NVM to include a memory-side cache (MSC) storage that is mapped to the system address space and that is reserved for storing persistent cache data during a power interruption;
a volatile memory (VM) configured to map to the system address space when in use, the VM to include a MSC region that is mapped to the system address space and that is reserved as a MSC for the NVM;
a MSC controller communicatively coupled to the VM and the NVM, and configured to manage caching between the MSC region and the NVM for one or more software applications;
an asynchronous memory refresh (AMR) controller communicatively coupled to the NVM and the VM, the AMR to include AMR circuitry configured to:
receive a notice of a power interruption;
identify restoration cache data from the cache data in the MSC region to be restored upon a reboot; and
copy the restoration cache data from the MSC region to the MSC storage as persistent cache data.

2. The system of claim 1, wherein the MSC controller is further configured to:
upon a system reboot, copy the persistent cache data from the MSC storage to the MSC region.

3. The system of claim 1, wherein the AMR controller is integrated with the MSC controller.

4. The system of claim 1, wherein the AMR circuitry, in identifying the restoration cache data, is further configured to identify the restoration cache data from associated metadata.

5. The system of claim 1, wherein the AMR circuitry, in identifying the restoration cache data, is further configured to identify the restoration cache data from an algorithm that estimates memory access likelihood.

6. The system of claim 5, wherein the algorithm is a cache replacement algorithm used by the MSC controller in managing the cache data in the MSC region.

7. The system of claim 1, further comprising:
a cache line priority table communicatively coupled to the MSC controller and to the AMR controller, wherein the MSC controller comprises caching circuitry configured to:
store, in the cache line priority table, a pointer to each cache line in the MSC region; and
determine a restoration priority for each cache line in the cache line priority table;
wherein the AMR circuitry, in identifying the restoration cache data, is further configured to:
identify a total size of cache data to be restored upon reboot; and
select a portion of the cache data from the cache line priority table according to the restoration priority of the cache lines up to the total size as the restoration cache data.

8. The system of claim 7, wherein the MSC circuitry is further configured to maintain at least two groupings of pointers according to restoration priority.

9. The system of claim 7, wherein MSC circuitry is further configured to maintain an order of the pointers in the cache line priority table according to the restoration priority.

10. The system of claim 1, further comprising:
a reserve power source electrically coupled to the AMR controller and switchably coupled to the VM and the NVM, wherein the AMR circuitry is further configured to initiate power from the reserve power source to the VM and the NVM to copy the restoration cache data from the MSC region to the MSC storage at least when system power is insufficient to perform the copy.

11. The system of claim 10, where in the reserve power source is switchably coupled to the MSC controller.

12. The system of claim 1, wherein at least one of the NVM or the VM is supported on a dual in-line memory module (DIMM).

13. The system of claim 1, wherein at least one of the VM or the NVM is supported on a processor package.

14. The system of claim 1, wherein the VM is dynamic random-access memory (DRAM).

15. The system of claim 1, wherein the VM is three-dimensional (3D) cross-point NVM configured as VM.

16. The system of claim 1, wherein the NVM is three-dimensional (3D) cross-point memory.

17. The system of claim 1, wherein the MSC controller further comprises:
an encryption/decryption engine communicatively coupled to the VM, and configured to encrypt the restoration cache data prior to being copied from the MSC region.

18. A device, comprising:
a memory support substrate;
a nonvolatile memory (NVM) coupled to the memory support substrate configured to map to a system address space when in use, and is directly accessible by software applications, the NVM to include a memory-side cache (MSC) storage that is mapped to the system address space and that is reserved for storing persistent cache data during a power interruption;
a volatile memory (VM) coupled to the memory support substrate and configured to map to the system address space when in use, and the VM to include a MSC region that is mapped to the system address space and that is reserved as a MSC for the NVM;
wherein the VM and the NVM are further configured to communicatively couple to:
a MSC controller configured to manage caching between the MSC region and the NVM for one or more software applications;
an asynchronous memory refresh (AMR) controller including AMR circuitry configured to:
receive a notice of a power interruption;
identify restoration cache data from the cache data in the MSC region to be restored upon a reboot; and
copy the restoration cache data from the MSC region to the MSC storage as persistent cache data.

19. The device of claim 18, wherein the memory support substrate is a dual in-line memory module (DIMM).

20. The device of claim 18, further comprising the AMR controller coupled to the memory support substrate.

21. The device of claim 20, further comprising:
a reserve power source coupled to the memory support substrate and electrically coupled to the AMR controller, and switchably coupled to the VM and the NVM, wherein the AMR circuitry is further configured to initiate power from the reserve power source to the VM and the NVM to copy the restoration cache data from the MSC region to the reserved MSC storage at least when system power is insufficient to perform the copy.

22. The device of claim 18, wherein the VM is dynamic random-access memory (DRAM) and the NVM is three-dimensional (3D) cross-point memory.

23. A method of reducing memory access latency overhead in software-accessible persistent system memory, comprising;
caching, in a memory-side cache (MSC) region of a volatile memory (VM) mapped to a system address space, cache data from one or more software applications accessing a nonvolatile memory (NVM) mapped to the system address space;
receiving, by an asynchronous memory refresh (AMR) controller, a notice of a power interruption;
identifying, using the AMR controller, restoration cache data from the cache data in the MSC region to be restored upon a system reboot; and
copying, using an MSC controller, the restoration cache data from the MSC region to a MSC storage in the NVM as persistent cache data.

24. The method of claim 23, further comprising:
determining, by system firmware upon system reboot, the persistent cache data in the MSC storage region of the NVM;
notifying a processor of the persistent cache data in the MSC storage region;
sending copy instructions from the processor to the MSC controller;
generating, by the MSC controller, memory commands to copy the persistent cache data from the MSC storage to the MSC region; and
copying the persistent cache data from the MSC storage to the MSC region according to the memory commands.

25. The method of claim 24, wherein, prior to copying the restoration cache data from the MSC region to the MSC storage, the method further comprises:
encrypting the restoration cache data in the MSC controller to generate encrypted restoration cache data; and
copying the encrypted restoration cache data from the MSC region to the MSC storage as restoration cache data.

26. The method of claim 25, wherein, in copying the persistent cache data from the MSC storage to the MSC region, the method further comprises:
sending the encrypted persistent cache data from the MSC storage to the MSC controller;
decrypting the encrypted persistent cache data by the MSC controller to generate persistent cache data; and
copy the persistent cache data from the MSC controller to the MSC region.

* * * * *